United States Patent [19]

Frigon et al.

[11] Patent Number: 4,662,157
[45] Date of Patent: May 5, 1987

[54] SHAFT TO HARNESS COUPLING ASSEMBLY

[76] Inventors: Donald R. Frigon, 5995 Wildwood #142, Westland, Mich. 48185; Anthony J. DeMarco, 35186 Lancashire, Livonia, Mich. 48152

[21] Appl. No.: 752,793

[22] Filed: Jul. 8, 1985

[51] Int. Cl.$^4$ .............................................. B68B 1/00
[52] U.S. Cl. ............................................ 54/2; 54/51
[58] Field of Search ................ 278/118, 35; 54/2, 51; 280/63

[56] References Cited

U.S. PATENT DOCUMENTS

| | | | |
|---|---|---|---|
| 435,740 | 9/1890 | Engle | 54/51 |
| 3,907,325 | 9/1975 | Gaines et al. | 280/63 X |
| 3,944,243 | 3/1976 | Yates | 280/63 |
| 4,072,000 | 2/1978 | Clemens | 54/2 |
| 4,313,611 | 2/1982 | Heinze, Jr. et al. | 280/63 |
| 4,326,367 | 4/1982 | Cashman | 54/2 |
| 4,354,605 | 10/1982 | Brutsman | 211/49 D |
| 4,371,184 | 2/1983 | Henden et al. | 280/204 |
| 4,473,991 | 10/1984 | La Mura et al. | 54/2 |
| 4,543,772 | 10/1985 | Mitchell | 54/2 |

Primary Examiner—Joseph J. Rolla
Assistant Examiner—Jay I. Alexander
Attorney, Agent, or Firm—Basile, Weintraub & Hanlon

[57] ABSTRACT

A coupling assembly is provided for detachably securing the thills or shafts of a two-shaft racing sulky to the harness saddle which accommodates adjustable lengthwise and vertical positioning of the shaft relative to the saddle while accommodating a limited range of free pivotal movement of the shaft about a point which is fixed relative to the saddle. The assembly provides for precise tracking control of the sulky while affording reasonable freedom for relative motion between shaft and saddle to accommodate twisting and minor linear motion of the saddle by body movements of the horse in stride and turns.

2 Claims, 6 Drawing Figures

SHAFT TO HARNESS COUPLING ASSEMBLY

BACKGROUND OF THE INVENTION

The present invention relates to improvements to couplings for coupling the thills or shafts of a racing sulky to the harness saddle.

The thills or shafts of racing sulkies are typically attached to the harness saddle by various strap arrangements which, when secured, bind the shaft to the saddle in a position in which the shaft is quite firmly restrained against movement in any direction relative to the saddle. Because the saddle in turn is firmly cinched to the horse, the saddle moves with that portion of the horse's body to which it is cinched and thus twists and moves up and down and from side to side as the horse strides or leans to one side when going around a turn. Because of the relatively rigid interconnection between the saddle and the sulky shafts, movements of the type referred to above are resisted by the shafts, thus absorbing a certain amount of unproductive energy from the horse.

The rigid coupling between the sulky shafts and saddle is considered generally desirable in order to assure the sulky will closely and precisely track the horse and will not swing wide of the horse in turns or when maneuvering in close quarters.

The present invention is especially directed to a shaft-to-saddle coupling which will enable the sulky to precisely track the horse and yet at the same time will permit, within a limited range, free relative movement of the shaft relative to the saddle to minimize the resistance of the coupling to displacement or twisting motion of the saddle generated by body movement of the horse in striding or in leaning into a turn.

SUMMARY OF THE INVENTION

In accordance with the present invention, a pair of rigid frames are fixedly mounted at opposite sides of the saddle, each including a vertically extending frame member having a plurality of vertically spaced bores extending through the frame member from front to rear. A coupling pin is slidably passed from rear to front through a selected one of the bores and locked against rearward withdrawal by a cotter pin passed through the projecting end of the pin at the front of the frame member. The rearward end of the coupling pin in coupled, by a ball-and-socket type coupling, to a coupling block. The coupling block is provided with a front-to-rear passage which receives an elongate tube fixedly mounted upon the forward end of a sulky shaft. A spring-loaded pin, which may be manually retracted, in seated in a selected one of a plurality of longitudinally spaced recesses on the coupling tube.

Other objects and features of the invention will become apparent by reference to the following specification and to the drawings.

IN THE DRAWINGS

Figure 1:
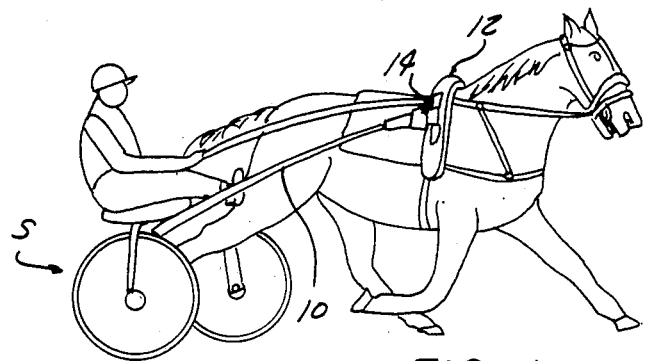
FIG. 1 is a sketch showing a racing sulky harnessed to a horse.

In the sketch of FIG. 1, a racing sulky S is shown with its shafts 10 attached to the harness saddle 12 at each side of the horse by a shaft-to-saddle coupling designated generally 14. While various types of couplings 14 are employed, typically involving the use of straps, the function of the coupling is to enable the horse to pull the sulky and thus, particularly in a racing environment, the coupling between the shaft and saddle is made as tight and rigid as possible. The present invention is especially directed to an improved form of shaft-to-saddle coupling which will accommodate a limited but adequate amount of relative motion between the shaft and saddle while maintaining the shaft and saddle against any movement relative to each other in a front-to-rear direction parallel to the path of the horse.

Figure 2:
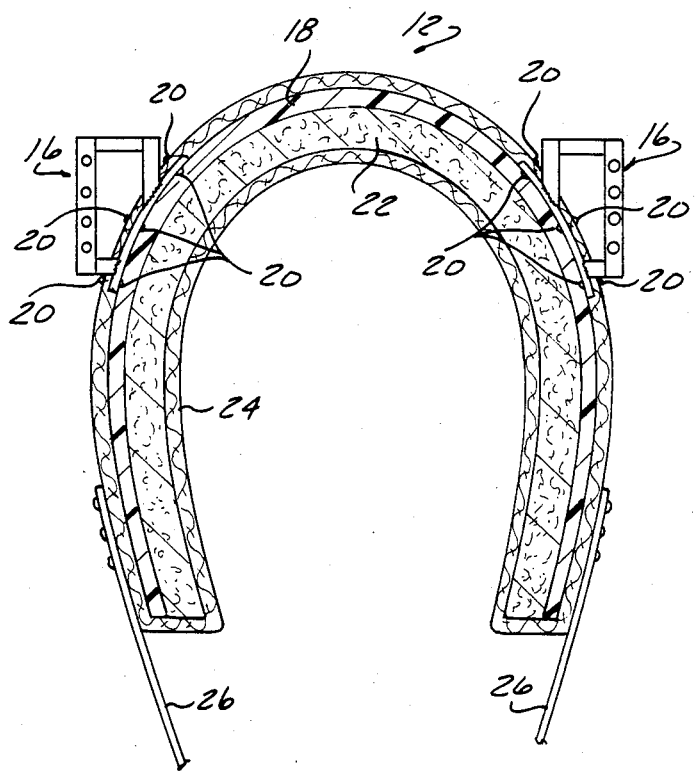
FIG. 2 is a cross-sectional view, taken on a vertical plane, of the harness saddle, with certain parts broken away or omitted.

Referring now to FIG. 2, there is shown a cross-sectional view through a racing saddle having a pair of coupling frames 16, which form a portion of the coupling structure of the present invention, fixedly mounted upon the saddle.

The saddle 12 itself is of typical construction and includes an elongate strip of molded nylon formed into a generally inverted U-shape. Typical dimensions of the nylon strip 18 are approximately $\frac{1}{8}$ inch in thickness and approximately 3 inches in width. The strip is permanently formed in the general shape shown in FIG. 2 but possesses a certain degree of resilience so that the legs of the U-shaped strip can be resiliently flexed toward and away from each other.

A pair of coupling frame members 16 embodying the present invention are fixedly secured at the indicated locations to strip 18, as by rivets 20. Padding 22 is located at the inner side of strip 18 and held in position by a fabric covering sheath 24 which encloses the padding and nylon strip 18. Saddle 12 is cinched to the horse by means of straps partially indicated at 26 which are riveted to the saddle. Other elements of the typical harness which are attached to the saddle have been omitted from FIG. 2 for sake of clarity.

Figure 3:
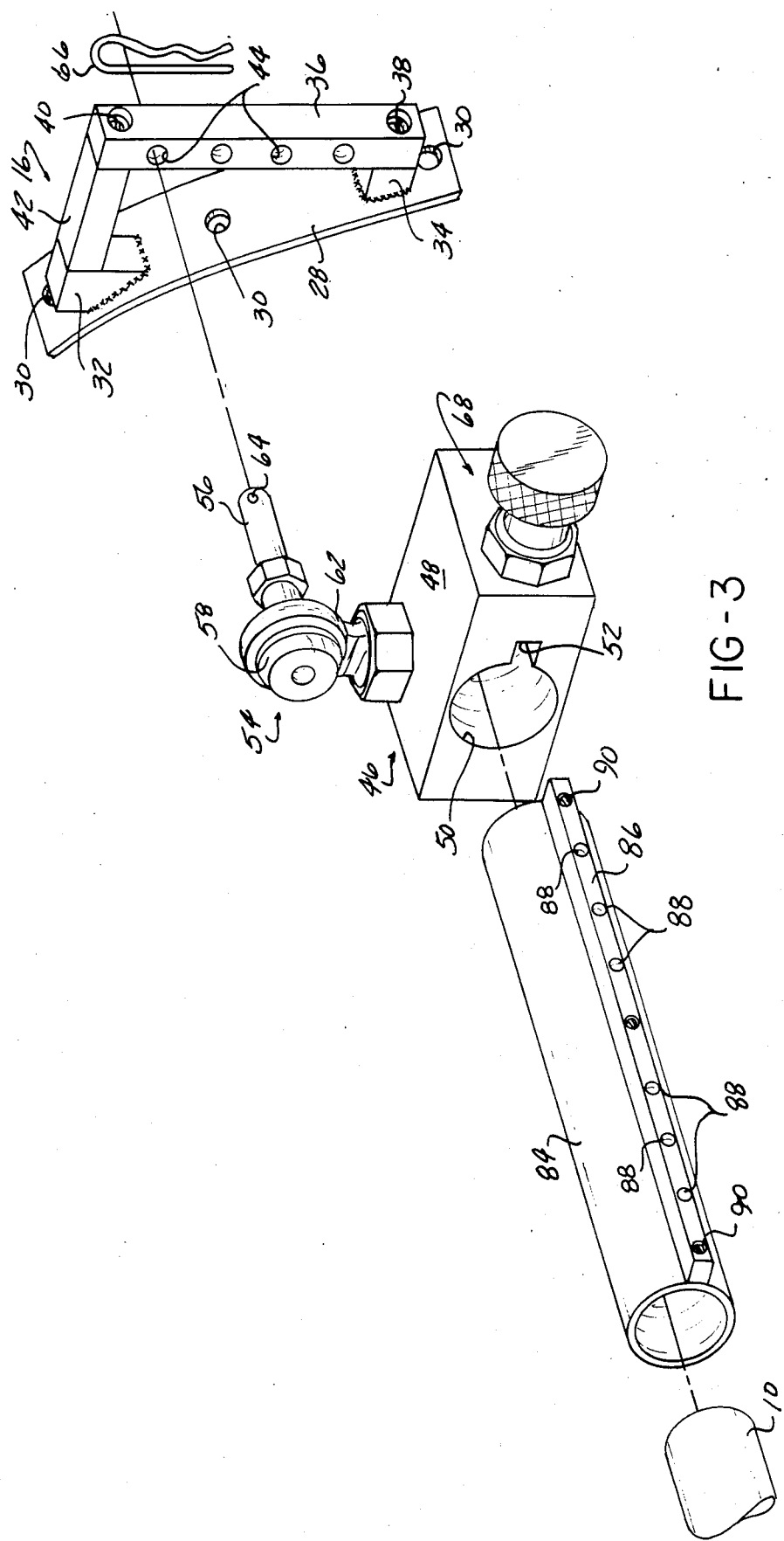
FIG. 3 is an exploded view in perspective showing the individual elements of the shaft-to-saddle coupling of the present invention.

Individual subassemblies of the coupling assembly of the present invention are shown in the exploded perspective view of FIG. 3.

The coupling frame 16 includes a mounting plate 28 curved to conform to the nylon strip 18 of the saddle and formed with bores as at 30 to accommodate the rivets employed to attach frame 16 to the saddle. Upper and lower mounting blocks 32, 34 are welded to mounting plate 28 at the indicated locations. A vertical frame member 36 is fixedly mounted at its lower end to the lower mounting block 34 by a recessed bolt 38 received in a tapped bore formed in block 34. The upper end of frame member 36 is fixedly attached to the upper mounting block 32 by means of a second recessed bolt 40 which passes through a spacer 42 and is threadably received in a tapped bore in mounting block 32. The horizontal dimensions of lower mounting block 34 and spacer 42 as viewed in FIG. 3 are such that frame member 36 extends vertically when frame member 16 is mounted upon sadddle 12. A plurality of coupling pin receiving bores 44 extend entirely through frame member 36 from front to rear.

A coupling block subassembly designated generally 46 includes a coupling block 48 formed with a bore 50 having a keyway 52 at one side of the bore, the bore and keyway extending entirely through block 48 from front to rear.

Figure 6:
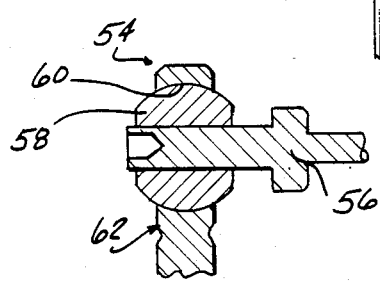
FIG. 6 is a cross-sectional view taken on the line 6—6 of FIG. 4.

Near the front end of coupling block 48 at the side of the block opposite that in which keyway 52 is cut, a ball-and-socket rod end coupling designated generally 54 is fixedly mounted upon block 48. The coupling 54 includes a coupling pin 56 having a ball-like member 58 (see FIG. 6) fixedly secured to its rearward end. The ball-like member 58, whose outer surface is spherical, is received and trapped within a complementary shaped recess 60 formed in a housing 62 fixedly mounted upon block 48. Coupling pin 56 is thus supported in housing 62 for rotational movement relative to housing 62 about the axis of coupling pin 56 and also about any two other axes that are mutually perpendicular to each other and to the axis of pin 56. Stated another way, pin 56 may be pivoted or rotated relative to housing 62 about any axis which passes through the center of the spherical recess 60 in housing 62.

A bore 64 passing through pin 56 near its front end is located to project from the front side of frame member 36 of frame 13 when pin 56 is seated in one of the bores 44 through frame member 36. A cotter pin 66 passed through bore 64 will retain the coupling block subassembly 46 in assembled relationship to frame 16, while accommodating free pivotal movement of block 48 about the center of the spherical ball-and-socket coupling 54 relative to frame 16.

Figure 5:
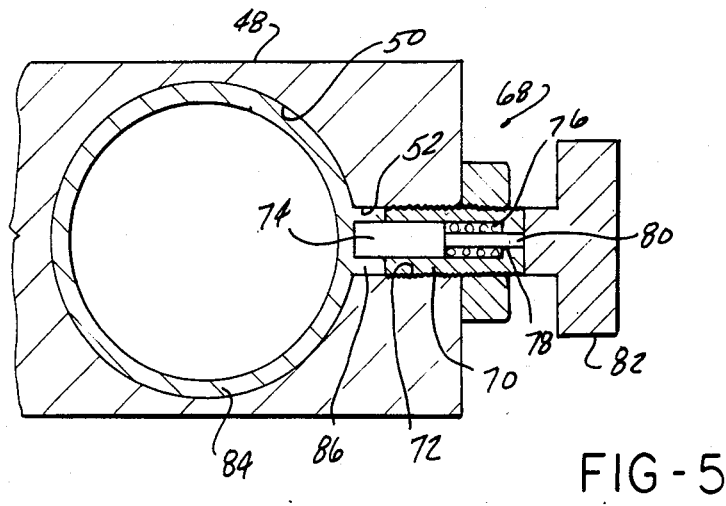
FIG. 5 is a cross-sectional view taken on the line 5—5 of FIG. 4.

At the opposite side of block 48, a spring-loaded pin assembly 68, shown in cross section in FIG. 5, is mounted in block 48. As best seen in FIG. 5, assembly 68 includes an externally threaded housing 70 threadably received within a theaded bore 72 in block 48 which passes through a sidewall of the block into keyway 52. A pin 74 is slidably received within housing 70 and is continually biased to the left as viewed in FIG. 5 by a compression spring 76 seated between pin 74 and an end wall 78 of housing 70. A shaft 80 fixedly secured to pin 74 couples the pin to an external knob 82 which may be manually actuated to withdraw pin 74 to the right as viewed in FIG. 5 into housing 70.

A coupling tube 84 is dimensioned to be slidably received within passage 50 in block 48 and carries an elongated key 86 having a plurality of radially inwardly extending recesses, 88 dimensioned to receive pin 74. Coupling tube 84 is designed to be fixedly mounted upon the forward end of a sulky shaft 10 and, in the normal usage of the coupling, the tube 84 will be fixedly and permanently mounted on the sulky shaft. This attachment may be made by a plurality of screws such as 90 which pass radially through key 86, coupling tube 84 and are threaded into sulky shaft 10.

Figure 4:
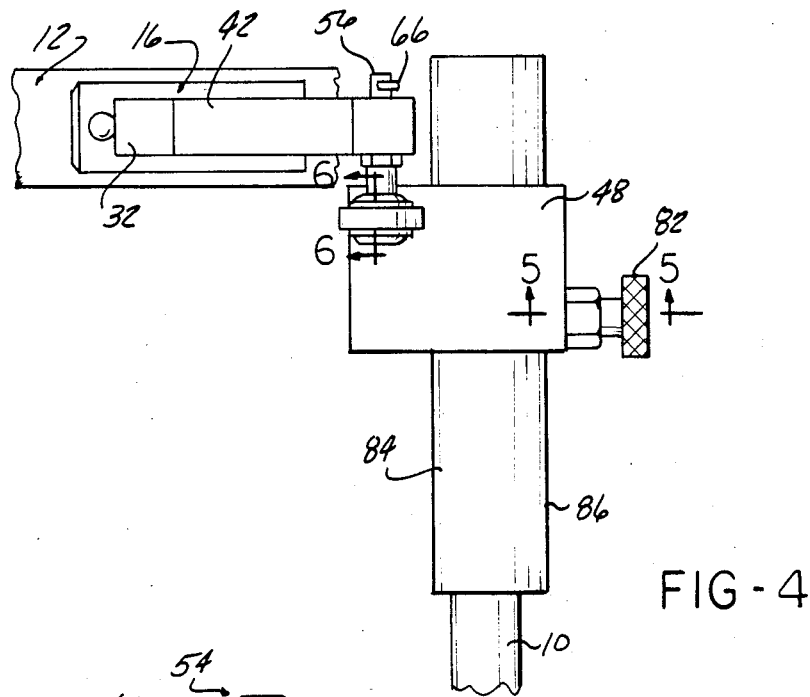
FIG. 4 is a top plan view showing the parts of FIG. 3 assembled.

In FIG. 4, a plan view of the parts of FIG. 3 in their assembled relationship (for the right-hand side of saddle 12) is shown. Coupling pin 56 is passed through a selected one of bores 44 in vertical frame member 36 and held in its assembled position by cotter pin 66. Coupling tube 84 is fixedly secured to the front end of the right-hand sulky shaft 10 and the tube is inserted through bore 50 with key 86 received in keyway 52. The pin of spring-loaded pin assembly 68 is seated within a selected one of the recesses 88 on the coupling tube, the plurality of recesses affording a simple and efficient way of adjusting the sulky shaft lengthwise relative to the harness saddle. The vertically spaced bores 44 in vertical frame member 36 likewise enable a vertical adjustment of the shaft 10 relative to the saddle.

The coupling assemblies on both sides of saddle 12 are identical except for the fact that the block subassembly 46 is made in right- and left-handed versions so that the ball-and-socket assembly 54 projects upwardly from the front inside corner of the coupling block and the key 52 of the block 48 is on the outer side of the block relative to the horse so that the knob 82 of the spring-loaded pin assembly is readily accessible.

The structure of the ball-and-socket coupling 54 is such that the free pivotal movement of coupling pin 56 relative to housing 62 is limited, by engagement of the coupling pin shaft with the front edge of recess 60, to about 30 degrees from the central axis of recess 60. This permits free pivotal movement of pin 56 relative to housing 62, and thence the coupled sulky shaft, which is ample to accommodate for motion of the saddle in directions other than that of the direct forward pull being exerted by the horse. As the horse strides, for example, one side of the saddle may be urged forwardly as the foreleg on that side reaches ahead while the opposite side of the saddle may at the same time be moving rearwardly because of the rearward displacement of the opposite foreleg. The saddle is also subject to a slight upward and downward movement in synchronism with the horse's stride as well as lateral displacement. As the horse draws the sulky around a turn in the track, the horse tends to lean toward the inside of the track, thus again displacing the saddle from the optimum relationship to the shafts and sulky. Where, as in conventional shaft-to-saddle couplings, the shaft is bound to a rigidly fixed relationship to the saddle, these minor displacements are resisted by the coupling, absorb unproductive energy from the horse and present at least a minor degree of interference with free movement of the horse.

The coupling described above, by virtue of the ball-and-socket coupling interposed between the shaft and saddle, freely accommodates these minor displacements and in field tests has resulted in a noticeable improvement in a given horse's performance.

While one embodiment of the invention has been described in detail, it will be apparent to those skilled in the art the disclosed embodiment may be modified. Therefore, the foregoing description is to be considered exemplary rather than limiting, and the true scope of the invention is that defined in the following claims.

We claim:

1. A coupling assembly for coupling a sulky shaft to a harness saddle, said assembly comprising a rigid frame adapted to be fixedly secured to said saddle at one side thereof, said frame including a vertically disposed frame member having a coupling pin receiving opening extending therethrough from front to rear, a coupling pin adapted to be received in said opening to project forwardly through said frame member, means for detachably securing said pin against rearward withdrawal from said frame member, a coupling block, ball-and-socket means coupling the rearward end of said coupling pin to said coupling block, said block having a passage extending therethrough from front to rear, an elongate tube slidably received in said passage, means for fixedly mounting said tube upon the front end of said sulky shaft, and means for locking said tube to said block at selected positions of longitudinal adjustment relative to said block, said means for locking comprising means defining a plurality of outwardly opening radial recesses in said tube at longitudinally spaced positions along one side of said tube, and spring-loaded pin means mounted in said block including a pin operable when received in one of said recesses to lock said tube against longitudinal movement relative to said block.

2. The invention defined in claim 1, wherein said vertically disposed frame member includes means defining a plurality of said coupling pin receiving openings therethrough at respective vertically spaced locations on said frame member.

* * * * *